United States Patent
Nefzger et al.

(10) Patent No.: US 9,328,196 B2
(45) Date of Patent: May 3, 2016

(54) PROCESS FOR THE PREPARATION OF POLYRICINOLEIC ACID ESTER POLYOLS HAVING PRIMARY HYDROXYL END GROUPS

(75) Inventors: Hartmut Nefzger, Pulheim (DE); Jörg Hofmann, Krefeld (DE); Erika Bauer, Jüchen (DE); Bert Klesczewski, Köln (DE); Klaus Lorenz, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 247 days.

(21) Appl. No.: 13/988,606

(22) PCT Filed: Nov. 18, 2011

(86) PCT No.: PCT/EP2011/070477
§ 371 (c)(1),
(2), (4) Date: Jun. 19, 2013

(87) PCT Pub. No.: WO2012/069383
PCT Pub. Date: May 31, 2012

(65) Prior Publication Data
US 2013/0261205 A1    Oct. 3, 2013

(30) Foreign Application Priority Data
Nov. 22, 2010   (EP) .................................... 10192094

(51) Int. Cl.
| | | |
|---|---|---|
| *C08G 63/91* | (2006.01) | |
| *C08G 63/06* | (2006.01) | |
| *C08G 63/664* | (2006.01) | |
| *C08G 63/87* | (2006.01) | |
| *C08G 18/42* | (2006.01) | |
| *C08G 18/36* | (2006.01) | |
| *C08G 63/82* | (2006.01) | |
| *C08G 18/40* | (2006.01) | |
| *C08G 18/48* | (2006.01) | |
| *C08G 18/66* | (2006.01) | |
| *C08G 18/76* | (2006.01) | |
| *C08G 18/08* | (2006.01) | |
| *C08G 101/00* | (2006.01) | |

(52) U.S. Cl.
CPC .............. *C08G 63/912* (2013.01); *C08G 18/14* (2013.01); *C08G 18/36* (2013.01); *C08G 18/4018* (2013.01); *C08G 18/4283* (2013.01); *C08G 18/4288* (2013.01); *C08G 18/4804* (2013.01); *C08G 18/4841* (2013.01); *C08G 18/4891* (2013.01); *C08G 18/6696* (2013.01); *C08G 18/7664* (2013.01); *C08G 63/06* (2013.01); *C08G 63/664* (2013.01); *C08G 63/82* (2013.01); *C08G 63/87* (2013.01); *C08G 2101/0008* (2013.01); *C08G 2101/0058* (2013.01); *C08G 2101/0083* (2013.01)

(58) Field of Classification Search
IPC .............. C08G 18/14,18/36, 18/4018, 18/4283, C08G 18/4841, 18/4891, 18/6696, 63/06, C08G 63/664, 63/82, 63/87, 63/912, 2101/0008, C08G 2101/0058, 2101/0083
See application file for complete search history.

(56) References Cited

U.S. PATENT DOCUMENTS

| | | |
|---|---|---|
| 4,248,930 A | 2/1981 | Haas et al. |
| 4,263,408 A | 4/1981 | Meyborg et al. |
| 4,487,853 A | 12/1984 | Reichel et al. |
| 4,644,017 A | 2/1987 | Haas et al. |
| 4,845,266 A | 7/1989 | Marx et al. |
| 2006/0167125 A1 | 7/2006 | Bauer et al. |
| 2007/0203319 A1* | 8/2007 | Dexheimer et al. .............. 528/44 |
| 2009/0143495 A1* | 6/2009 | Nozawa et al. ................ 521/157 |

FOREIGN PATENT DOCUMENTS

| | | |
|---|---|---|
| DE | 36 13 875 A1 | 10/1987 |
| DE | 102009029286 A1 | 4/2010 |
| EP | 0 000 389 A1 | 1/1979 |
| EP | 0 007 502 A1 | 2/1980 |
| EP | 0 176 013 A2 | 4/1986 |
| WO | WO-2004020497 A1 | 3/2004 |
| WO | WO 2008/123323 A1 * | 10/2008 |

OTHER PUBLICATIONS

International Search Report for PCT/EP2011/070477 mailed Apr. 5, 2012.

\* cited by examiner

*Primary Examiner* — Rabon Sergent
(74) *Attorney, Agent, or Firm* — Drinker Biddle & Reath LLP

(57) ABSTRACT

The present invention relates to a process for the preparation of polyricinoleic acid ester polyols having primary hydroxyl end groups. It furthermore relates to polyricinoleic acid ester polyols obtainable according to the invention and polyurethane polymers prepared using these polyols. The process comprises the steps: a) polycondensation of ricinoleic acid until a hydroxyl number of >0 mg of KOH/g to <60 mg of KOH/g is reached; and b) reaction of the product obtained in step a) or of a secondary product of the product obtained in step a) comprising carboxyl groups with an epoxide of the general formula (I), wherein R1 represents hydrogen, an alkyl radical or an aryl radical, with the proviso that >80% by weight to <100% by weight, based on the total amount of the epoxide (I) employed, is ethylene oxide and the reaction is carried out in the presence of an amine as the catalyst.

13 Claims, No Drawings

PROCESS FOR THE PREPARATION OF POLYRICINOLEIC ACID ESTER POLYOLS HAVING PRIMARY HYDROXYL END GROUPS

RELATED APPLICATIONS

This application is a national stage application (under 35 U.S.C. §371) of PCT/EP2011/070477, filed Nov. 18, 2011, which claims benefit of European Patent Application No. 10192094.0, filed Nov. 22, 2010, which is incorporated by reference herein.

The present invention relates to a process for the preparation of polyricinoleic acid ester polyols having primary hydroxyl end groups. It furthermore relates to polyricinoleic acid ester polyols obtainable according to the invention and polyurethane polymers prepared using these polyols.

Polyricinoleic acid esters are obtained industrially by polycondensation of ricinoleic acid. Compared with esterification of, for example, adipic acid and di-primary hydroxyl components, this reaction proceeds slowly and is therefore disadvantageous in economic terms. To compensate the substance-related reduced functionality of hydroxyl groups, a low molecular weight polyol such as hexanediol can be added as a further component in the synthesis of polyricinoleic acid esters in order to ensure in the end the excess of hydroxyl over carboxyl groups.

The secondary OH group of ricinoleic acid also functions as an end group of the polyricinoleic acid esters. When used in polyurethane (PU) systems, it is in turn distinguished in that it is not very reactive towards NCO groups and therefore the incorporation of polyricinoleate structural units into the PU matrix can take place only incompletely. This can lead, for example, to blooming or also to greasy surfaces in PU components.

In addition, conventional polyricinoleic acid esters have comparatively high acid numbers, for example 2 mg of KOH/g to 5 mg of KOH/g. However, free acid groups are capable of worsening the hydrolysis properties, in particular of polyester-based polyurethanes. They are therefore often taken up with sometimes expensive additives which bond acid groups, such as carbodiimides.

The functionalization of carboxyl groups in polyester polyol synthesis is disclosed in DE 36 13 875 A1. For the preparation of polyester polyols having an acid number of less than 1, a hydroxyl number of approximately 20 to approximately 400 and a functionality of expediently 2 to 3, polycarboxylic acids and/or anhydrides thereof and polyfunctional alcohols are subjected to a condensation reaction. This is advantageously effected in the absence of conventional esterification catalysts at temperatures of from 150° C. to 250° C. and optionally under reduced pressure. Polycondensation is carried out to an acid number of from 20 to 5 and the polycondensates obtained are then alkoxylated with 1 to 5 mol of alkylene oxide, for example 1,2-propylene oxide and/or preferably ethylene oxide, per carboxyl group in the presence of a tertiary amine. The tertiary amine is chosen from the group of N-methylimidazole, diazabicyclo[2,2,2]octane, diazabicyclo[5,4,0]undec-7-ene and pentamethyldiethylenetriamine. The catalyst is expediently employed in an amount of from 0.001 to 1.0% by weight, based on the weight of the polycondensate. The alkoxylation is advantageously carried out at temperatures of from 100° C. to 170° C. and under a pressure of from 1 to 10 bar. However, polyesters to be alkoxylated are based on polycarboxylic acids and not on monocarboxylic acids.

U.S. Pat. No. 4,487,853 discloses a process for the preparation of a polyether ester polyol having a high content of primary hydroxyl groups. The reaction is carried out here at a temperature of from 50° C. to 125° C. with: a) a condensate of a polyol having 2 to 8 hydroxyl groups and an equivalent weight of from 30 to 45 and an alkylene oxide having 2 to 4 carbon atoms and mixtures thereof, wherein the condensate has an equivalent weight of from 500 to 10,000 and the condensate is reacted with a cyclic organic anhydride to give a half-ester; and b) ethylene oxide in the presence of an active amount of an amine, oxide or salt of a divalent metal cation, wherein the ratio of the equivalents of the anhydride to the equivalents of the condensate is from about 1:1 to about 1:2 and wherein the molar ratio of ethylene oxide to anhydride is in the range of from about 2:1 to about 1.5:1.

The object of the present invention was to provide a process for the preparation of polyricinoleic acid ester polyols having primary hydroxyl groups, which renders possible a fast reaction procedure and wherein the polyricinoleic acid ester polyols obtained do not have to be after-treated with additives which bond acid groups.

It has been found, surprisingly, that the abovementioned object is achieved by a process for the preparation of polyricinoleic acid ester polyols having primary hydroxyl end groups, comprising the steps:

a) polycondensation of ricinoleic acid until a hydroxyl number of >0 mg of KOH/g to ≤60 mg of KOH/g is reached;

b) reaction of the product obtained in step a) or of a secondary product of the product obtained in step a) comprising carboxyl groups with an epoxide of the general formula (I):

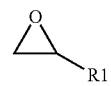

(1)

wherein R1 represents hydrogen, an alkyl radical or an aryl radical, with the proviso that ≥80% by weight to ≤100% by weight, based on the total amount of the epoxide (I) employed, is ethylene oxide, and wherein this reaction is carried out in the presence of an amine as the catalyst.

The invention also provides the polyricinoleic acid ester polyols obtainable by the process according to the invention (also called component A2 in the following).

In the process according to the invention, the ricinoleic acid is subjected to polycondensation only until the reaction has slowed down due to the decreasing concentration of OH and COOH groups. The COOH groups which remain in the polyricinoleic acid ester or in a secondary product thereof are reacted in a fast reaction with the epoxide (I) under catalysis by an amine catalyst. The OH groups of the ricinoleic acid which have not yet been esterified before the reaction with the epoxide remain in the reaction product as secondary OH end groups. If ricinoleic acid in technical grade quality having an excess of COOH group is employed as the starting substance, this reaction product with the epoxide (I) nevertheless comprises predominantly primary OH end groups.

In the process according to the invention, for example, polyricinoleic acid ester polyols having about 80 mol % of primary hydroxyl end groups can be obtained as products. It is not known that such high values can be obtained by other processes. The acid numbers of the products are ≤1 mg of KOH/g. They can thus be, for example, ≥0 mg of KOH/g to ≤0.1 mg of KOH/g, determined in accordance with DIN 53402. The hydroxyl numbers of the products according to DIN 53240 can be, for example, ≥20 mg of KOH/g to ≤100 mg of KOH/g. Industrially, for comparable end products, that is to say for polyols based on ricinoleic acid and having acid numbers in the range of from 0 to 5 mg of KOH/g, reaction times of beyond 80 hours are required. Reaction times of less than 30 hours can be achieved by the process according to the invention.

The process according to the invention starts from ricinoleic acid. The improved industrial use of a regenerable raw material is consequently made possible.

The polycondensation in step a) is preferably carried out without a catalyst, but it can also be catalysed by the catalysts known to the person skilled in the art. The polycondensation can be carried out by the usual methods, for example at elevated temperature, in vacuo, as azeotrope esterification and by the nitrogen blowing process. For example, the reaction temperature can be ≥180° C. to ≤220° C.

The condensation in step a) is allowed to proceed until the reaction mixture reaches a hydroxyl number of >0 mg of KOH/g to ≤60 mg of KOH/g, preferably ≥1 mg of KOH/g to ≤55 mg of KOH/g and more preferably ≥8 mg of KOH/g to ≤55 mg of KOH/g. The hydroxyl number can be determined in accordance with DIN 53240. The reaction in step a) can be monitored with respect to the hydroxyl number by regular taking of samples.

In step b), the reaction product from step a), which can be a polyricinoleic acid ester, is reacted with an epoxide (I). A further possibility is to react a secondary product of the polycondensation from step a). Such secondary products or derivatives are obtained by reaction of a polyricinoleic acid ester from step a) with further compounds. It is important here for the secondary products still to comprise carboxyl groups. These carboxyl groups then react with the epoxide (I).

The epoxide of the general formula (1) is a terminal epoxide having a substituent R1, which can be hydrogen, an alkyl radical or an aryl radical. In connection with the overall invention, the term "alkyl" generally includes substituents from the group of n-alkyl, such as methyl, ethyl or propyl, branched alkyl and/or cycloalkyl. In connection with the overall invention, the term "aryl" generally includes substituents from the group of mononuclear carbo- or heteroaryl substituents, such as phenyl, and/or polynuclear carbo- or heteroaryl substituents. According to the invention, ≥80% by weight to ≤100% by weight, based on the total amount of the epoxide (I) employed, is ethylene oxide. A desired high content of primary hydroxyl groups is obtained in this manner. The weight content can also be ≥90% by weight to ≤99.5% by weight or ≥95% by weight to ≤99% by weight. The molar ratio of epoxide to carboxyl end groups in the process according to the invention can be, for example, in a range of from ≥0.9:1 to ≤10:1, preferably from ≥0.95:1 to ≤5:1 and more preferably from ≥0.98:1 to ≤3:1.

The reaction of the polyester carboxylates with the epoxide is carried out in the presence of an amine, preferably a tertiary amine, as the catalyst. The amount of catalyst, based on the total weight of the reaction mixture, can be, for example, ≥10 ppm to ≤10,000 ppm, preferably ≥50 ppm to ≤5,000 ppm and more preferably ≥100 ppm to ≤2,000 ppm.

In one embodiment of the process according to the invention, this furthermore comprises, between step a) and step b), the step:
a1) reaction of the product obtained in step a) with a cyclic carboxylic acid anhydride.

The reaction product from step a1) is then here the secondary product of the reaction product from step a) mentioned in step b) which comprises carboxyl groups. Advantageously, a polyricinoleic acid ester from step a) is reacted with an equivalent amount of the anhydride. In the case of phthalic anhydride, for example, a polyester which has both aliphatic and aromatic COOH end groups is obtained. Both types of COOH end groups react in step b) under amine catalysis in a fast reaction with the epoxide (I), it being possible for the end product obtained in this way to have even higher contents of primary OH groups than that obtained in a two-stage reaction. For example, according to this variant the content of primary hydroxyl groups can be more than 80 mol %.

Preferably, the cyclic carboxylic acid anhydride employed in step a1) is chosen here from the group comprising phthalic anhydride, tetrahydrophthalic anhydride, succinic anhydride and/or maleic anhydride.

In a further embodiment of the process according to the invention, the epoxide of the general formula (I) in step b) is ethylene oxide. The highest contents of primary hydroxyl groups in the end product can be obtained by this means.

In a further embodiment of the process according to the invention, the catalyst in step b) is chosen from the group comprising:
(A1) amines of the general formula (2):

(2)

wherein:
R2 and R3 independently of each other are hydrogen, alkyl or aryl; or
R2 and R3 together with the N atom carrying them form an aliphatic, unsaturated or aromatic heterocycle;
n is an integer from 1 to 10;
R4 is hydrogen, alkyl or aryl; or
R4 represents —(CH$_2$)$_x$—N(R41)(R42), wherein:
    R41 and R42 independently of each other are hydrogen, alkyl or aryl; or
    R41 and R42 together with the N atom carrying them form an aliphatic, unsaturated or aromatic heterocycle;
    x is an integer from 1 to 10;
(B1) amines of the general formula (3):

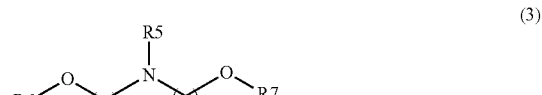

(3)

wherein:
R5 is hydrogen, alkyl or aryl;
R6 and R7 independently of each other are hydrogen, alkyl or aryl;
m and o independently of each other are an integer from 1 to 10;

and/or:
(C1) diazabicyclo[2.2.2]octane, diazabicyclo[5.4.0]undec-7-ene, dialkylbenzyl-amine, dimethylpiperazine, 2,2'-dimorpholinyldiethyl ether and/or pyridine.

Amines of the general formula (2) can be described in the broadest sense as amino alcohols or ethers thereof. If R4 is hydrogen, the catalysts can be incorporated into a polyurethane matrix when the polyol according to the invention is reacted with a polyisocyanate. This is advantageous in order to prevent emergence of the catalyst on the polyurethane surface, so-called "fogging" or VOC (volatile organic compounds) problems, which in the case of amines may be accompanied by an adverse odour problem.

Amines of the general formula (3) can be described in the broadest sense as amino (bis)alcohols or ethers thereof. If R6 or R7 are hydrogen, these catalysts can likewise be incorporated into a polyurethane matrix.

Preferably, in the amine of the general formula (2) R2 and R3 are methyl, R4 is hydrogen and n=2, or R2 and R3 are methyl, R4 is —(CH$_2$)$_2$—N(CH$_3$)$_2$ and n=2. Overall, either N,N-dimethylethanolamine or bis(2-(dimethylamino)ethyl) ether thus results.

It is furthermore preferable, in the amine of the general formula (3), for R5 to be methyl, R6 and R7 to be hydrogen, m to be 2 and o to be 2. Overall, N-methyldiethanolamine thus results.

In a further embodiment of the process according to the invention, in step b) the reaction with the epoxide of the general formula (I) takes place at a temperature of from ≥70° C. to ≤150° C. The reaction temperature can preferably be ≥80° C. to ≤130° C.

The present invention also provides a polyricinoleic acid ester polyol having primary hydroxyl end groups obtainable by a process according to the invention. Such a polyol can preferably have a number-average molecular weight of from ≥1,000 g/mol to ≤10,000 g/mol.

This polyol can be based, for example, on ricinoleic acid and an alkylene oxide C$_2$H$_3$R8O, where R8=hydrogen, that is to say on ricinoleic acid and ethylene oxide. For example, ≥1 mol to ≤5 mol of alkylene oxide, preferably ethylene oxide, can be incorporated per mol of the polyol. Without being bound to a theory, on incorporation of one ethylene oxide unit per carboxyl group, the following idealized formula (4a) can be assumed:

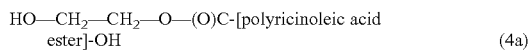

HO—CH$_2$—CH$_2$—O—(O)C-[polyricinoleic acid ester]-OH    (4a)

It is also possible for this polyol to be based on ricinoleic acid, phthalic anhydride and an alkylene oxide C$_2$H$_3$R8O, where R8=hydrogen, that is to say on ricinoleic acid, phthalic anhydride and ethylene oxide. Without being bound to a theory, on incorporation of one ethylene oxide unit per carboxyl group, the following idealized formula (4b) can be assumed:

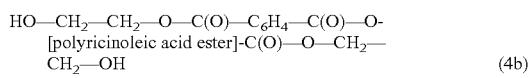

HO—CH$_2$—CH$_2$—O—C(O)—C$_6$H$_4$—C(O)—O-[polyricinoleic acid ester]-C(O)—O—CH$_2$—CH$_2$—OH    (4b)

In one embodiment, the polyricinoleic acid ester polyol according to the invention has a content of primary hydroxyl end groups of from ≥55 mol % to ≤95 mol %. This is to be understood as meaning the molar content in the polyol in total, that is to say not based on an individual molecule. It can be determined, for example, by means of $^1$H-NMR spectroscopy. The content can also be ≥58 mol % to ≤90 mol % or ≥60 mol % to ≤85 mol %.

In a further embodiment, the polyricinoleic acid ester polyol according to the invention has an acid number of from ≥0 mg of KOH/g to ≤1 mg of KOH/g. The acid number can be determined with the aid of the standard DIN 53402 and can also be ≥0.01 mg of KOH/g to ≤0.07 mg of KOH/g. Regardless of this, the hydroxyl number of the polyols according to the invention according to DIN 53240 can be, for example, ≥20 mg of KOH/g to ≤100 mg of KOH/g.

The polyricinoleic acid ester polyol according to the invention can furthermore have a viscosity at 25° C. of from ≥500 mPas to ≤6,000 mPas. This viscosity can be determined by means of the standard DIN EN ISO 3219:10194 and can also be in a range of from ≥1,000 mPas to ≤4,000 mPas or from ≥1,400 mPas to ≤2,000 mPas. Such viscosity ranges result in a better processability of the polyol.

In a further embodiment, the polyricinoleic acid ester polyol according to the invention is in the form of a composition which comprises as a further constituent:
(A2) amines of the general formula (5):

(5)

wherein:
R9 and R10 independently of each other are hydrogen, alkyl or aryl; or
R9 and R10 together with the N atom carrying them form an aliphatic, unsaturated or aromatic heterocycle;
p is an integer from 1 to 10;
R11 is hydrogen, alkyl or aryl; or
R11 represents —(CH$_2$)$_y$—N(R12)(R13), wherein:
R12 and R13 independently of each other are hydrogen, alkyl or aryl; or
R12 and R13 together with the N atom carrying them form an aliphatic, unsaturated or aromatic heterocycle;
y is an integer from 1 to 10;
(B2) amines of the general formula (6):

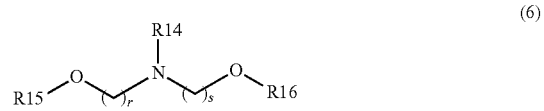

(6)

wherein:
R14 is hydrogen, alkyl or aryl;
R15 and R16 independently of each other are hydrogen, alkyl or aryl;
r and s independently of each other are an integer from 1 to 10;
and/or:
(C2) diazabicyclo[2.2.2]octane, diazabicyclo[5.4.0]undec-7-ene, dialkylbenzyl-amine, dimethylpiperazine, 2,2'-dimorpholinyldiethyl ether and/or pyridine.

In certain variants, such compounds from the groups (A2), (B2) and (C2) can also be used as so-called blowing agent catalysts, that is to say they preferentially catalyse the reaction of isocyanate groups with water to form carbon dioxide, and to a lesser extent also the reaction thereof with hydroxyl groups to form urethane groups. This composition can therefore be directly employed further in the preparation of polyurethanes. N,N-Dimethylethanolamine, bis(2-(dimethylamino)ethyl)ether, diazabicyclo[2.2.2]octane or N-methyldiethanolamine are preferred. The amount of these compounds (A2), (B2) and/or (C2), relative to the polyol according to the invention, can be, for example, ≥10 ppm to ≤10,000 ppm, preferably ≥50 ppm to ≤5,000 ppm and more preferably ≥100 ppm to ≤2,000 ppm.

The present invention also provides a polyurethane polymer obtainable from the reaction of a polyricinoleic acid ester polyol according to the invention with a polyisocyanate.

Suitable polyisocyanates (component B) are aliphatic, cycloaliphatic, araliphatic, aromatic and heterocyclic polyisocyanates such as are described e.g. by W. Siefken in Justus Liebigs Annalen der Chemie, 562, pages 75 to 136, for example those of the formula (7)

$$Q(NCO)_n \qquad (7)$$

in which
n=2-4, preferably 2-3,
and
Q denotes an aliphatic hydrocarbon radical having 2-18, preferably 6-10 C atoms, a cycloaliphatic hydrocarbon radical having 4-15, preferably 6-13 C atoms or an araliphatic hydrocarbon radical having 8-15, preferably 8-13 C atoms.

For example, these are those polyisocyanates such as are described in EP-A 0 007 502, pages 7-8. Preferred compounds are as a rule the polyisocyanates which are readily accessible industrially, e.g. 2,4- and 2,6-toluylene-diisocyanate, and any desired mixtures of these isomers ("TDI"); polyphenylpolymethylene-polyisocyanates, such as are prepared by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-toluylene-diisocyanate or from 4,4'- and/or 2,4'-diphenylmethane-diisocyanate. The polyisocyanates containing urethane groups (prepolymers) can be, for example, reaction products of the polyisocyanates with polyricinoleic acid ester polyols according to the invention or any other desired polyols (for example the conventional polyols). Preferably, at least one compound chosen from the group consisting of 2,4- and 2,6-toluylene-diisocyanate, 4,4'- and 2,4'- and 2,2'-diphenylmethane-diisocyanate and polyphenyl-polymethylene-polyisocyanate ("polynuclear MDI") is employed as the polyisocyanate, and a mixture comprising 4,4'-diphenylmethane-diisocyanate and 2,4'-diphenylmethane-diisocyanate and polyphenylpolymethylene-polyisocyanate is particularly preferably employed as the polyisocyanate.

The characteristic number (isocyanate index) indicates the percentage ratio of the amount of isocyanate actually employed to the stoichiometric (NCO) amount, i.e. the amount of isocyanate groups calculated for the reaction of the OH equivalents. In the reaction mixture from which the polyurethane polymer is obtained, the characteristic number of NCO equivalents to OH equivalents can be in a range of from, for example, 50 to 250, preferably 70 to 130, particularly preferably 75 to 115.

The invention likewise relates to a polyurethane polymer obtainable from the reaction of a polyricinoleic acid ester polyol, which is in the form of a composition comprising as further constituents the abovementioned compounds of groups (A2), (B2) and/or (C2), with a polyisocyanate.

In one embodiment, the polyurethane polymer according to the invention is in the form of a flexible polyurethane foam.

Flexible polyurethane foams in the context of the present invention are those polyurethane polymers, and in particular foams, of which the bulk density according to DIN EN ISO 3386-1-98 is in the range of from ≥10 kg/m³ to ≤150 kg/m³ and of which the compressive strength according to DIN EN ISO 3386-1-98 is in the range of from ≥0.5 kPa to ≤20 kPa (at 40% deformation).

The invention thus also provides the production of flexible polyurethane foams having a bulk density according to DIN EN ISO 3386-1-98 in the range of from ≥10 kg/m³ to ≤150 kg/m³, preferably from ≥20 kg/m³ to ≤70 kg/m³, and a compressive strength according to DIN EN ISO 3386-1-98 in the range of from ≥0.5 kPa to ≤20 kPa (at 40% deformation and the 4th cycle) by reaction of component A (polyol formulation) comprising
  A1 50 to 95 parts by wt., preferably 50 to 80 parts by wt. (based on the sum of the parts by wt. of components A1 and A2) of conventional polyether polyol,
  A2 5 to 50 parts by wt., preferably 20 to 50 parts by wt. (based on the sum of the parts by wt. of components A1 and A2) of polyricinoleic acid ester having a hydroxyl number of from 30 mg of KOH/g to 80 mg of KOH/g, preferably from ≥40 mg of KOH/g to ≤60 mg of KOH/g, particularly preferably from ≥45 mg of KOH/g to ≤50 mg of KOH/g and an acid number of from ≥5 mg of KOH/g to ≤50 mg of KOH/g, preferably ≥5.2 mg of KOH/g to ≤20 mg of KOH/g, particularly preferably from ≥5.4 mg of KOH/g to ≤10 mg of KOH/g,
  A3 0.5 to 25 parts by wt., preferably 2 to 5 parts by wt. (based on the sum of the parts by wt. of components A1 and A2) of water and/or physical blowing agents,
  A4 0.05 to 10 parts by wt., preferably 0.2 to 4 parts by wt. (based on the sum of the parts by wt. of components A1 and A2) of auxiliary substances and additives, such as
    a) catalysts,
    b) surface-active additives,
    c) pigments or flameproofing agents,
  A5 0 to 10 parts by wt., preferably 0 to 5 parts by wt. (based on the sum of the parts by wt. of components A1 and A2) of compounds which contain hydrogen atoms which are reactive towards isocyanates and have a molecular weight of 62-399,
with component B comprising polyisocyanates,
wherein the production is carried out at a characteristic number of from 50 to 250, preferably 70 to 130, particularly preferably 75 to 115, and
wherein all the parts by weight stated for components A1 to A5 in the present application are standardized such that the sum of the parts by weight of components A1+A2 in the composition is 100.

Components A2 and B have been explained above.
Component A1

Compounds which are called conventional polyether polyols (component A1) in the context of the invention are those which are alkylene oxide addition products of starter compounds having Zerewitinoff-active hydrogen atoms, that is to say polyether polyols having a hydroxyl number according to DIN 53240 of from ≥15 mg of KOH/g to ≤80 mg of KOH/g, preferably from ≥20 mg of KOH/g to ≤60 mg of KOH/g. Examples of such polyols are known to the person skilled in the art. They can have a hydroxyl number according to DIN 53240 of from ≥15 mg of KOH/g to ≤80 mg of KOH/g, preferably from ≥20 mg of KOH/g to ≤60 mg of KOH/g. Starter compounds having Zerewitinoff-active hydrogen atoms which are employed for the conventional polyether polyols usually have functionalities of from 2 to 6, preferably from 3 to 6, particularly preferably of 3, and the starter compounds are preferably hydroxy-functional. Examples of hydroxy-functional starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, bisphenol A, 1,3,5-trihydroxybenzene, and condensates of formaldehyde and phenol or melamine or urea containing methylol groups. Preferably, glycerol and/or trimethylolpropane is employed as the starter compound. The use of such conventional trifunctional polyols based on a starter compound having a functionality of from 3 to 6 avoids the disadvantages which bifunctional polyols have, for example poor deformation values (compression set). Conventional polyether polyols based on a starter compound having a functionality of 3 are particularly preferred, since these also, just as avoiding the disadvantages originating from polyols of higher functionality, such as, for example, tetrafunctional polyols, such as their poorer elongation at break mechanical values.

Suitable alkylene oxides are, for example, ethylene oxide, propylene oxide, 1,2-butylene oxide or 2,3-butylene oxide and styrene oxide. Preferably, propylene oxide and ethylene oxide are added to the reaction mixture individually, in a mixture or successively. If the alkylene oxides are metered in successively, the products prepared comprise polyether chains having block structures. Products having ethylene oxide end blocks are characterized, for example, by increased concentrations of primary end groups, which impart an advantageous isocyanate reactivity to the systems.

Component A3

Water and/or physical blowing agents are employed as component A3. As physical blowing agents, carbon dioxide and/or highly volatile organic substances, for example, are employed as blowing agents.

Component A4

Auxiliary substances and additives are used as component A4, such as
 a) catalysts (activators),
 b) surface-active additives (surfactants), such as emulsifiers and foam stabilizers, in particular those of low emission, such as, for example, products of the Tegostab® LF series,
 c) additives such as reaction retardants (e.g. acid-reacting substances, such as hydrochloric acid or organic acid halides), cell regulators (such as, for example, paraffins or fatty alcohols or dimethylpolysiloxanes), pigments, dyestuffs, flameproofing agents (such as, for example, tricresyl phosphate), stabilizers against the influences of ageing and weathering, plasticizers, fungistatically and bacteriostatically acting substances, fillers, (such as, for example, barium sulfate, kieselguhr, carbon black or prepared chalk) and release agents.

These auxiliary substances and additives which are optionally to be co-used are described, for example, in EP-A 0 000 389, pages 18-21. Further examples of auxiliary substances and additives which are optionally to be co-used according to the invention and details of the mode of use and action of these auxiliary substances and additives are described in Kunststoff-Handbuch, volume VII, edited by G. Oertel, Carl-Hanser-Verlag, Munich, 3rd edition, 1993, e.g. on pages 104-127.

Preferred catalysts according to component A4 a) are aliphatic tertiary amines (for example trimethylamine, tetramethylbutanediamine), cycloaliphatic tertiary amines (for example 1,4-diaza(2,2,2)bicyclooctane), aliphatic amino ethers (for example dimethylaminoethyl ether and N,N,N-trimethyl-N-hydroxyethyl-bisaminoethyl ether), cycloaliphatic amino ethers (for example N-ethylmorpholine), aliphatic amidines, cycloaliphatic amidines, urea, derivatives of urea (such as, for example, aminoalkylureas, see, for example, EP-A 0 176 013, in particular (3-dimethylaminopropylamine)-urea) and tin catalysts (such as, for example, dibutyltin oxide, dibutyltin dilaurate, tin octoate).

Particularly preferred catalysts according to component A4 a) are
 α) urea, derivatives of urea and/or
 β) amines and amino ethers, which in each case comprise a functional group which reacts chemically with the isocyanate. Preferably, the functional group is a hydroxyl group or a primary or secondary amino group. These particularly preferred catalysts have the advantage that these have greatly reduced migration and emission properties.

Examples of particularly preferred catalysts according to component A4 a) which may be mentioned are: (3-dimethylaminopropylamine)-urea, 2-(2-dimethylaminoethoxy)ethanol, N,N-bis(3-dimethylaminopropyl)-N-isopropanolamine, N,N,N-trimethyl-N-hydroxyethyl-bisaminoethyl ether and 3-dimethylaminopropylamine.

Component A5

Compounds which have at least two hydrogen atoms which are reactive towards isocyanates and a molecular weight of from 32 to 399 are optionally employed as component A5. These are to be understood as meaning compounds having hydroxyl groups and/or amino groups and/or thiol groups and/or carboxyl groups, preferably compounds having hydroxyl groups and/or amino groups, which serve as chain lengthening agents or crosslinking agents. These compounds as a rule have 2 to 8, preferably 2 to 4 hydrogen atoms which are reactive towards isocyanates. For example, ethanolamine, diethanolamine, triethanolamine, sorbitol and/or glycerol can be employed as component A5. Further examples of compounds according to component A5 are described in EP-A 0 007 502, pages 16-17.

The present invention is explained further with the aid of the following examples. The materials and abbreviations used here have the following meaning and sources of supply:

Ricinoleic acid: Oleo Chemie
Phthalic anhydride (PA): Lanxess GmbH, Germany
2,2,2-Diazabicyclooctane: Aldrich
N,N-Dimethylethanolamine (DMEA): Aldrich
N-Methyldiethanolamine (MDEA): Aldrich
DABCO® (triethylenediamine, diazabicyclo[2.2.2]octane): Aldrich
MDI: mixture comprising 62 wt. % of 4,4'-diphenylmethane-diisocyanate, 8 wt. % of 2,4'-diphenylmethane-diisocyanate and 30 wt. % of polynuclear MDI having an NCO content of 32.1% by weight
PET: polyether polyol having an OH number of approx. 28 mg of KOH/g, prepared by addition of propylene oxide and ethylene oxide in the ratio of 85 to 15 using glycerol as the starter, having approx. 85 mol % of primary OH groups
Tegostab® B 8681: formulation of organo-modified polysiloxanes, Evonik
Addocat® 105: amine catalyst from Rheinchemie
Addocat® 108: amine catalyst from Rheinchemie
Addocat® SO: Tin catalyst from Rheinchemie
The analyses were carried out as follows:
Dynamic viscosity: MCR 51 rheometer from Anton Paar in accordance with DIN 53019 with a CP 50-1 measuring cone (diameter 50 mm, angle 1°) at shear rates of 25, 100, 200 and 500 s$^{-1}$. The polyricinoleates show viscosities which are independent of the shear rate.

Ratio of primary and secondary OH groups: by means of $^{13}$C-NMR (Bruker DPX 400, deuterochloroform as the solvent): The relevant resonances in the $^{13}$C-NMR (based on TMS=0 ppm) were assigned as follows: Resonance at 61.1 ppm primary OH groups of the polyricinoleic acid ester polyol, resonance at secondary 71.5 ppm secondary OH groups of the polyricinoleic acid ester polyol.

Hydroxyl number: with the aid of the standard DIN 53240
Acid number: with the aid of the standard DIN 53402
A-1) and A-2): Preparation of Polyricinoleate Precursors

EXAMPLE A-1

2,200 g (approx. 6.8 mol) of ricinoleic acid were heated to 200° C. under a nitrogen blanket in a 4 liter 4-necked flask equipped with a heating mushroom, mechanical stirrer, internal thermometer, column, reflux divider with thermometer, descending condenser and receiver. Water was distilled off under normal pressure for 3 hours, a vacuum to finally 15 mbar was applied slowly in the course of one hour and the reaction was brought to completion for a further 20 hours and the following properties determined:

Analysis of the polyricinoleate A-1:
Hydroxyl number: 10.5 mg of KOH/g
Acid number: 29.4 mg of KOH/g
Viscosity: 210 mPas (75° C.), 2,140 mPas (25° C.)

EXAMPLE A-2

2,200 g (approx. 6.8 mol) of ricinoleic acid were heated to 200° C. under a nitrogen blanket in a 4 liter 4-necked flask equipped with a heating mushroom, mechanical stirrer, internal thermometer, column, reflux divider with thermometer, descending condenser and receiver. Water was distilled off under normal pressure for 3 hours, a vacuum to finally 15 mbar was applied slowly in the course of one hour and the reaction was brought to completion for a further 20 hours and the following properties determined:

Analysis of the polyricinoleate (intermediate product):
Hydroxyl number: 9.4 mg of KOH/g
Acid number: 30.2 mg of KOH/g 51 g (0.345 mol) of phthalic anhydride were added to the reaction mixture at 140° C. The mixture was stirred for one hour and the following properties were determined:

Analysis of the resulting polyricinoleate A-2:
Hydroxyl number: 1.4 mg of KOH/g
Acid number: 37.9 mg of KOH/g
Viscosity: 210 mPas (75° C.), 2,150 mPas (25° C.)

The following Table 1 summarizes Examples A-1 and A-2:

TABLE I

| Example | | A-1 | A-2 |
|---|---|---|---|
| Ricinoleic acid | [g] | 2,200 | 2,200 |
|  | [mol] | 6.8 | 6.8 |
| Reaction time | [h] | 24 | 24 |
| Intermediate product: | | | |
| OH number | [mg of KOH/g] | — | 9.4 |
| Acid number | [mg of KOH/g] | — | 30.2 |
| Phthalic anhydride | [g] | — | 51 |
|  | [mol] | — | 0.345 |

TABLE I-continued

| Example | | A-1 | A-2 |
|---|---|---|---|
| Reaction time | [h] | — | 1 |
| End product: | | | |
| OH number | [mg of KOH/g] | 10.5 | 14 |
| Acid number | [mg of KOH/g] | 29.4 | 37.9 |

A-3C: PREPARATION OF THE POLYRICINOLEIC ACID ESTER A-3C (COMPARATIVE EXAMPLE)

13,000 kg of ricinoleic acid and 650 kg of hexanediol were drawn into a 16,000 liter stirred tank with distillation columns and an attached fractionating column and were heated to 200° C. under and while stirring. During the heating up phase, water of reaction was distilled off under normal pressure. When the reaction temperature was reached a vacuum was applied. The pressure was lowered to 20 mbar in the course of one hour During this time, the overhead temperature was kept at the level of the water boiling point curve by means of regulation of the fractionating column temperature. Under a pressure of 200 mbar, 320 g of a 28% strength solution of tin dichloride (anhydrous) in ethylene glycol were added after 3.5 hours. At the same time the fractionating column temperature was fixed at 60° C. The acid number was monitored in the course of the further reaction: The acid number was 10 mg of KOH/g after a reaction time of 24 hours in total, 5 mg of KOH/g after 48 hours, 3.5 mg of KOH/g after 72 hours and 3.0 mg of KOH/g after 84 hours. After a reaction time of 84 hours the contents of the reactor were cooled to 130° C.

Analysis of the resulting polyricinoleic acid ester A3-C:
Hydroxyl number: 37.5 mg of KOH/g
Acid number: 3.0 mg of KOH/g
Viscosity: 850 mPas (25° C.)
Catalyst concentration: 4 ppm of Sn in the end product
B) Alkoxylation

EXAMPLE B-1

200 g of the precursor A-1 (acid number=29.4 mg of KOH/g; OH number=10.5 mg of KOH/g) and 0.209 g (1,000 ppm, based on the total batch) of the amine catalyst N-methyldiethanolamine were initially introduced into a 1 l high-grade steel pressure reactor under nitrogen and were heated up to 125° C. 9.2 g of ethylene oxide were then metered into the reactor at 125° C. over a period of 30 min. The mixture was then allowed to after-react at 125° C. until the pressure in the reactor remained constant over a period of 30 min (resulting after-reaction time see Table 2). Finally, readily volatile contents were distilled off in vacuo at 90° C. for 30 min and the reaction mixture was cooled to room temperature.

EXAMPLES B-2 AND B-3

The procedure was analogous to Example B-1, but instead of the amine catalyst DABCO (triethylenediamine), N,N-dimethylethanolamine was employed for Example B-2 and, respectively, bis(2-dimethylaminoethyl) ether was employed for Example B-3, in the stated amount (1,000 ppm).

The particular after-reaction time and the analytical data of Example B-1, B-2 and B-3 can be seen from the following Table 2:

TABLE 2

| Example | | B-1 | B-2 | B-3 |
|---|---|---|---|---|
| Precursor | | A-1 | A-1 | A-1 |
| Amine catalyst | | N-methyl-diethanol-amine | DABCO (triethylene-diamine) | N,N-dimethyl-ethanolamine |
| After-reaction time | [min] | 204 | 107 | 3 |
| OH number | [mg of KOH/g] | 43.4 | 39.6 | 44.5 |
| Acid number | [mg of KOH/g] | 0.02 | 0.05 | 0.01 |
| Viscosity | [mPas, 25° C.] | 1,671 | 1,480 | 1,725 |
| Primary OH groups | [mol %] | 68 | 77 | 58 |

EXAMPLE B-4

200 g of the precursor A-2 (acid number=37.9 mg of KOH/g; OH number=1.4 mg of KOH/g) and 0.212 g (1,000 ppm, based on the total batch) of the amine catalyst DABCO (triethylenediamine) were initially introduced into a 1 l high-grade steel pressure reactor under nitrogen and were heated up to 125° C. 11.9 g of ethylene oxide were then metered into the reactor at 125° C. over a period of 30 min. The mixture was then allowed to after-react at 125° C. until the pressure in the reactor remained constant over a period of 30 min (resulting after-reaction time see Table 3). Finally, readily volatile contents were distilled off in vacuo at 90° C. for 30 min and the reaction mixture was cooled to room temperature.

EXAMPLE B-5 AND B-6

The procedure was analogous to Example B-4, but instead of the amine catalyst DABCO (triethylenediamine), N,N-dimethylethanolamine was employed for Example B-5 and, respectively, bis(2-dimethylaminoethyl)ether was employed for Example B-6, in the stated amount (1,000 ppm).

The particular after-reaction time and the analytical data of Example B-4, B-5 and B-6 can be seen from the following Table 3:

TABLE 3

| Example | | B-4 | B-5 | B-6 |
|---|---|---|---|---|
| Precursor | | A-2 | A-2 | A-2 |
| Amine catalyst | | DABCO (triethylene-diamine) | N,N-dimethyl-ethanolamine | bis(2-dimethyl-aminoethyl) ether |
| After-reaction time | [min] | 122 | 127 | 128 |
| OH number | [mg of KOH/g] | 38.0 | 37.0 | 39.0 |
| Acid number | [mg of KOH/g] | 0.03 | 0.06 | 0.03 |
| Viscosity | [mPas, 25° C.] | 2,151 | 1,627 | 1,955 |
| Primary OH groups | [mol %] | 75 | 84 | 77 |

C) Production of Flexible Polyurethane Foams

The starting substances listed in the examples according to the following Tables 4, 5 and 6 are reacted with one another in the conventional method of processing for the production of flexible slabstock polyurethane foams by the one-stage process.

TABLE 4

| | Example | | C-1 (comparison) | C-2 |
|---|---|---|---|---|
| Formulation | PET | [parts by weight] | 77.85 | 77.85 |
| | A-3C | [parts by weight] | 19.46 | 0.00 |
| | Polyol from B-2 | [parts by weight] | 0.00 | 19.46 |
| | Polyol from B-5 | [parts by weight] | 0.00 | 0.00 |
| | Water | [parts by weight] | 2.24 | 2.24 |
| | Tegostab B 8681 | [parts by weight] | 0.10 | 0.10 |
| | Addocat 105 | [parts by weight] | 0.16 | 0.16 |
| | Addocat 108 | [parts by weight] | 0.15 | 0.15 |
| | Addocat SO | [parts by weight] | 0.05 | 0.05 |
| | MDI | [WR] | 35.09 | 35.30 |
| | Characteristic number | | 90 | 90 |
| Processing | Start time | [s] | 10 | 10 |
| | Rising time | [s] | 120 | 120 |
| Properties | Foam stability | | good | good |
| | Foam evaluation | | good | good |
| | Cell structure | | fine | fine |

ABBREVIATION

WR=weight ratio of component A to component B at the stated characteristic number and based on 100 parts by weight of component A.

TABLE 5

| | Example | | C-3 | C-4 (comparison) |
|---|---|---|---|---|
| Formulation | PET | [parts by weight] | 80 | 60 |
| | A-3C | [parts by weight] | | 40 |
| | Polyol from B-2 | [parts by weight] | | |
| | Polyol from B-5 | [parts by weight] | 20 | |
| | Water | [parts by weight] | 2.30 | 2.30 |
| | Tegostab B 8681 | [parts by weight] | 0.10 | 0.10 |
| | Addocat 105 | [parts by weight] | 0.16 | 0.16 |
| | Addocat 108 | [parts by weight] | 0.15 | 0.15 |
| | Addocat SO | [parts by weight] | 0.05 | 0.05 |
| | MDI | [parts by weight] | 36.24 | 36.35 |
| | Characteristic number | | 90 | 90 |
| Processing | Start time | [s] | 10 | 15 |
| | Rising time | [s] | 120 | 95 |
| Properties | Foam stability | | good | good |
| | Foam evaluation | | good | good |
| | Cell structure | | fine | fine |

TABLE 6

| | Example | | C-5 | C-6 |
|---|---|---|---|---|
| Formulation | PET | [parts by weight] | 60 | 60 |
| | A-3C | [parts by weight] | | |
| | Polyol from B-2 | [parts by weight] | 40 | |
| | Polyol from B-5 | [parts by weight] | | 40 |
| | Water | [parts by weight] | 2.30 | 2.30 |
| | Tegostab B 8681 | [parts by weight] | 0.10 | 0.10 |
| | Addocat 105 | [parts by weight] | 0.16 | 0.16 |
| | Addocat 108 | [parts by weight] | 0.15 | 0.15 |
| | Addocat SO | [parts by weight] | 0.05 | 0.05 |
| | MDI | [parts by weight] | 36.76 | 36.71 |
| | Characteristic number | | 90 | 90 |
| Processing | Start time | [s] | 15 | 15 |
| | Rising time | [s] | 90 | 95 |
| Properties | Foam stability | | good | good |
| | Foam evaluation | | good | good |
| | Cell structure | | fine | fine |

The flexible slabstock polyurethane foams obtained were subjected to a visual evaluation. The foam stability was classified with the aid of a scale of unstable-good-shrinkage. A classification of "unstable" here means that the foam shows severe settling phenomena up to collapse. A classification of "good" means that the foam shows an open cell structure without settling phenomena, and a classification of "shrinkage" means that the foam shrinks during the reaction due to be absence of cell opening.

The foam quality was classified with respect to the cell structure with the aid of a scale of poor-moderate-good. A classification of "poor" here means that the foam has no uniform cell structure and/or visible defects. A classification of "moderate" means that the foam has a chiefly uniform cell structure with only few visible defects, and a classification of "good" means that the foam has a uniform cell structure without visible defects.

The cell structure was classified with the aid of a scale of coarse-medium-fine. A classification of "coarse" here means that the foam has fewer than approx. 5 cells per cm. A classification of "medium" means that the foam has more than approx. 5 cells per cm and fewer than approx. 12 cells per cm, and a classification of "fine" means that the foam has more than approx. 12 cells per cm.

The flexible foams for the production of which the polyols according to the invention were processed showed completely comparable behaviour with respect to processing and properties to foams produced with the associated comparative experiments C-1 and C-4. Experiments C-1, C-2 and C-3 were carried out with 80 parts by weight of a conventional polyether polyol (PET), completely comparable foams being obtained. That is to say, the polyols B-2 and B-5 according to the invention are capable of replacing the conventional variants. The same conclusion also applies to experiments C-4, C-5 and C-6 with in each case an increased content of polyol based on regenerable raw materials.

The invention claimed is:

1. A process for preparing polyricinoleic acid ester polyol having primary hydroxyl end groups, comprising:
   a) polycondensing ricinoleic acid until a hydroxyl number of >0 mg of KOH/g to ≤60 mg of KOH/g is reached, to form a product;
   a1) reacting the product obtained in step a) with a cyclic carboxylic acid anhydride, to form a product of step a1);
   b) reacting the product obtained in step a1) comprising carboxyl groups with an epoxide of formula (I):

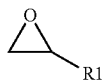

(1)

wherein
   R1 represents hydrogen, an alkyl radical or an aryl radical, with the proviso that ≥80% by weight to ≤100% by weight, based on the total amount of the epoxide of formula (I) employed, is ethylene oxide, and wherein this reaction is carried out in the presence of an amine as catalyst.

2. The process of claim 1, wherein the cyclic carboxylic acid anhydride in step a1) is selected from the group consisting of phthalic anhydride, tetrahydrophthalic anhydride, succinic anhydride, maleic anhydride, and mixtures thereof.

3. The process of claim 1, wherein in step b) the epoxide of formula (I) is ethylene oxide.

4. The process of claim 1, wherein said amine catalyst is selected from the group consisting of
   an amines of formula (2):

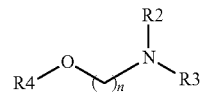

(2)

wherein

R2 and R3 independently of each other, are hydrogen, alkyl, or aryl; or

R2 and R3 together with the N atom carrying to which each is bonded form an aliphatic, unsaturated, or aromatic heterocycle;

n is an integer from 1 to 10; and

R4 is hydrogen, alkyl, or aryl, or

R4 is —(CH$_2$)$_x$—N(R41)(R42), wherein:

R41 and R42, independently of each other, are hydrogen, alkyl, or aryl; or

R41 and R42 together with the N atom to which each is bonded form an aliphatic, unsaturated, or aromatic heterocycle; and x is an integer from 1 to 10;

an amine of formula (3):

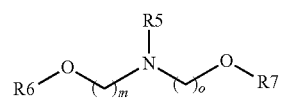

(3)

wherein:

R5 is hydrogen, alkyl, or aryl;

R6 and R7, independently of each other, are hydrogen, alkyl, or aryl; and m and o, independently of each other, are an integer from 1 to 10;

(diazabicyclo[2.2.2]octane, diazabicyclo[5.4.0]undec-7-ene, dialkylbenzylamine, dimethylpiperazine, 2,2'-dimorpholinyldiethyl ether, and pyridine, and any mixture thereof.

5. The process of claim 4, wherein, in the amine of formula (2), R2 and R3 are methyl, R4 is hydrogen, and n=2, or R2 and R3 are methyl, R4 is —(CH$_2$)$_2$—N(CH$_3$)$_2$, and n=2.

6. The process of claim 4, wherein, in the amine of formula (3), R5 is methyl, R6 and R7 are hydrogen, m=2, and o=2.

7. The process of claim 1, wherein the reaction of step b) takes place with the epoxide of formula (I) at a temperature of from ≥70° C. to ≤150° C.

8. A polyricinoleic acid ester polyol having primary hydroxyl end groups, prepared by the process of claim 1.

9. The polyricinoleic acid ester polyol having primary hydroxyl end groups of claim 8, wherein said polyricinoleic acid ester polyol has an acid number of from ≥0 mg of KOH/g to ≤1 mg of KOH/g.

10. A composition comprising the polyricinoleic acid ester polyol having primary hydroxyl end groups of claim 8 and
(A2) an amine of formula (5):

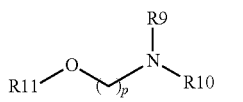

(5)

wherein

R9 and R10, independently of each other, are hydrogen, alkyl, or aryl; or

R9 and R10 together with the N atom to which each is bonded form an aliphatic, unsaturated, or aromatic heterocycle;

p is an integer from 1 to 10;

R11 is hydrogen, alkyl, aryl; or $-(CH_2)_y-N(R12)(R13)$, wherein:

R12 and R13, independently of each other, are hydrogen, alkyl, or aryl; or

R12 and R13 together with the N atom to which each is bonded form an aliphatic, unsaturated or aromatic heterocycle; and y is an integer from 1 to 10;

(B2) an amine of formula (6):

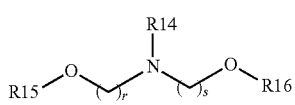

(6)

wherein:

R14 is hydrogen, alkyl, or aryl;

R15 and R16, independently of each other, are hydrogen, alkyl, or aryl;

r and s, independently of each other, are an integer from 1 to 10;

and/or (C2) diazabicyclo[2.2.2]octane, diazabicyclo[5.4.0]undec-7-ene, dialkylbenzylamine, dimethylpiperazine, 2,2'-dimorpholinyldiethyl ether, and/or pyridine.

11. A polyurethane polymer obtained from the reaction of a polyricinoleic acid ester polyol of claim 8 with a polyisocyanate.

12. A flexible polyurethane foam comprising the polyurethane polymer of claim 11.

13. A process for producing a flexible polyurethane foam having a bulk density according to DIN EN ISO 3386-1-98 in the range of from $\geq 10\,kg/m^3$ to $\leq 150\,kg/m^3$ and a compressive strength according to DIN EN ISO 3386-1-98 in the range of from $\geq 0.5$ kPa to $\leq 20$ kPa, at 40% deformation and the 4th cycle, comprising reacting component A, which comprises A1 from 50 to 95 parts by weight, based on the sum of the parts by weight of components A1 and A2, of polyether polyol;

A2 from 5 to 50 parts by weight, based on the sum of the parts by weight of components A1 and A2, of the polyricinoleic acid ester having primary hydroxyl end groups of claim 8, A3 from 0.5 to 25 parts by weight, based on the sum of the parts by weight of components A1 and A2, of water and/or physical blowing agents, A4 from 0.05 to 10 parts by weight, based on the sum of the parts by weight of components A1 and A2, of auxiliary substances and additives, A5 from 0 to 10 parts by weight, based on the sum of the parts by weight of components A1 and A2, of compounds which contain hydrogen atoms which are reactive towards isocyanates and have a molecular weight of from 62 to 399, with component B which comprises polyisocyanate, wherein the production of said flexible polyurethane foam is carried out at a characteristic number of from 50 to 250 and wherein all the parts by weight stated for components A1 to A5 are standardized such that components A1 and A2 in the composition sum to 100 parts by weight.

* * * * *